UNITED STATES PATENT OFFICE.

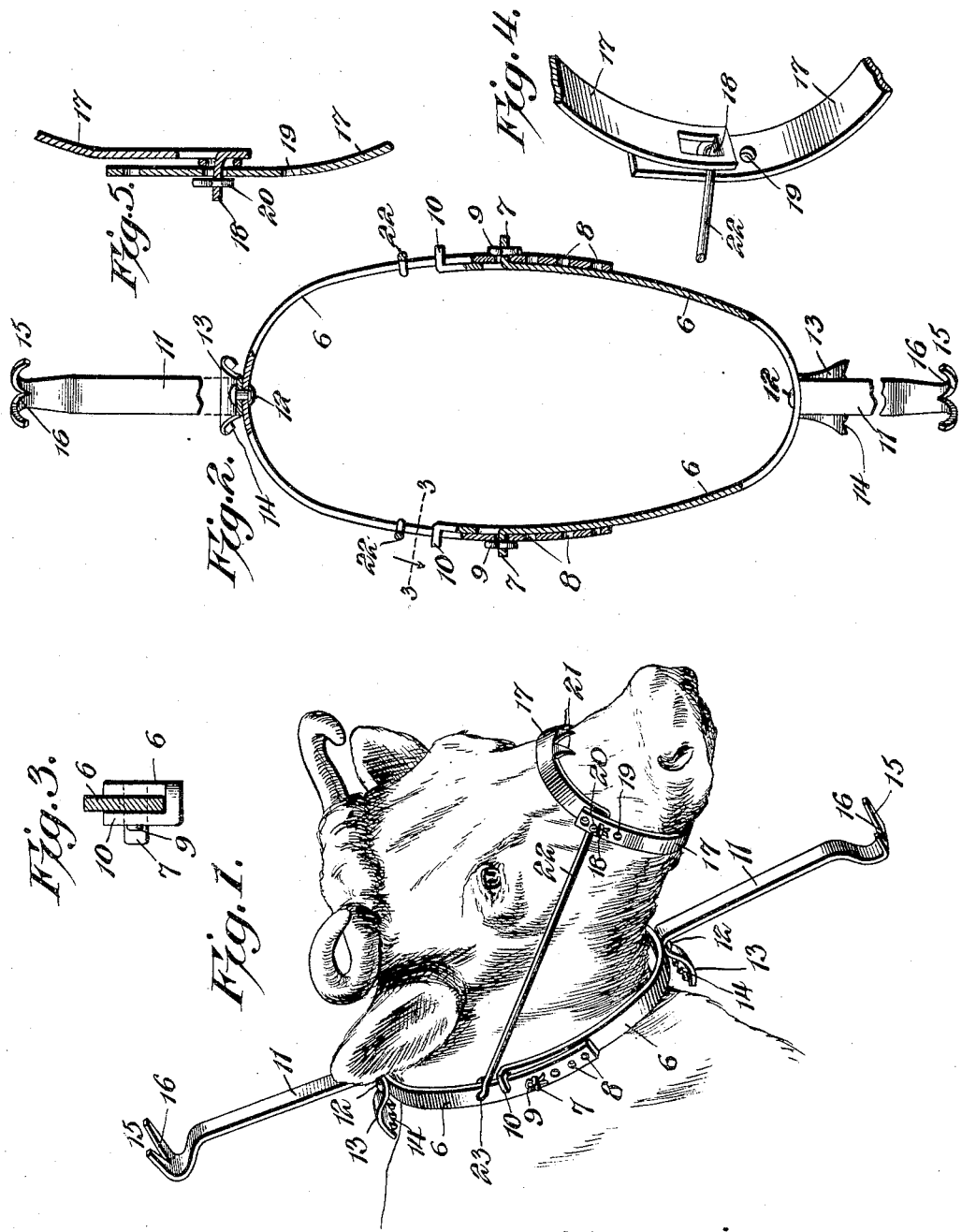
No. 770,632. PATENTED SEPT. 20, 1904.
T. H. EWING.
ANIMAL POKE.
APPLICATION FILED SEPT. 25, 1903.
NO MODEL.
T. H. Ewing, Inventor No. 770,632. Patented September 20, 1904.

THOMAS H. EWING, OF WICHITA, KANSAS, ASSIGNOR OF TWO-THIRDS TO WILL J. STEWART AND W. J. SHARON, OF WICHITA, KANSAS.

ANIMAL-POKE.

SPECIFICATION forming part of Letters Patent No. 770,632, dated September 20, 1904.

Application filed September 25, 1903. Serial No. 174,617. (No model.)

*To all whom it may concern:*

Be it known that I, THOMAS H. EWING, a citizen of the United States, residing at Wichita, in the county of Sedgwick and State of Kansas, have invented a new and useful Animal-Poke, (Case A,) of which the following is a specification.

This invention relates to animal-pokes carried by the animal and so constructed that if such animal attempt to pass through or over a fence the poke will inflict sufficient pain to cause the animal to desist in its attempts.

The object of this invention is to provide a structure of the above character which is thoroughly efficient in action, is not injurious to the animal under ordinary conditions, can be readily applied or removed by an unskilled person, though not liable to accidental detachment, and is adjustable to fit animals of different sizes.

One embodiment of the invention is illustrated in the accompanying drawings and described in the following specification; but said invention is not limited to the specific structure shown, as is indicated by a modified form of construction set forth in a copending application, Serial No. 174,618, of even date.

In the drawings accompanying this application, Figure 1 is a view of the head of an animal, showing the improved poke applied thereto. Fig. 2 is a view in elevation of the neck-embracing ring, portions thereof being illustrated in section. Fig. 3 is a detail sectional view on the line 3 3 of Fig. 2. Fig. 4 is a detail perspective view of a portion of the nose-embracing ring. Fig. 5 is a vertical sectional view through the same.

Similar reference-numerals indicate corresponding parts in all the figures of the drawings.

In the embodiment illustrated a neck-embracing ring is employed comprising a pair of bow-sections 6, having their end portions overlapped. The end portions of one section are provided with integral outstanding pivot-studs 7, preferably struck up from the metal, as illustrated. These studs are arranged to be passed through any of a series of openings 8, formed in the adjacent portions of the other bow-section. Their free ends are provided with openings through which are passed split keys 9, that thus hold the sections against displacement while permitting the pivotal movements thereof. The sections are free to swing in a rearwardly direction, but are prevented passing an alined relation in their forward movements by means of stop-hooks 10, carried by the free ends of one section and located in the paths of movement of the other section.

Fence-engaging or stop arms 11 are secured, respectively, to the opposite portions of the neck-embracing ring, or, in other words, to the central portions of the sections 6 thereof. These arms are each secured by means of a suitable rivet 12 contiguous to one end, and said end is rearwardly projected, as shown at 13, and has its rear edge serrated to form a plurality of teeth 14. This end is also slightly curved, as illustrated, and constitutes a prod, as is hereinafter more fully described. The free end of each arm is bent into a forwardly-extending wire-engaging hook 15, that is preferably bifurcated, as shown at 16, by a V-shaped notch. The front end of the hook is preferably disposed in substantial alinement with the main portion of the arm, so that the danger of injuring other cattle is reduced to a minimum.

The neck-embracing ring and arms constitute or may be termed a "stop" member or element, and in connection therewith there is employed a nose-embracing ring, consisting of sections 17, also formed of bows, one of said sections having outstanding pivot-studs 18, formed by striking up the metal of the same. These studs pass through openings 16, formed in the other section, and are held against displacement by keys 20, passed through the studs. The upper bow-section is preferably provided with spurs 21. Connections between the stop member or neck-embracing ring and the nose-embracing ring are provided in the form of links 22, said links being attached to the pivots 18 of the nose-embracing ring and fastened to the upper bow-section 6 at one side of the pivot-studs 7 by being passed through openings 23 in said section.

It will be seen by reference to Fig. 1 that the poke can be readily applied to an animal and properly adjusted to the size of the same. Under normal conditions the bow-sections of each ring are alined, and there is no material discomfort occasioned. Should the animal, however, attempt to pass through or over a fence the stop-arms 11 will engage the wires thereof, and consequently the sections of the neck-embracing ring will be swung rearwardly. This will bring the teeth 14 of the prods 13 into engagement with the animal's neck. The rearward movement of the neck-embracing ring-sections will cause draft strains upon the links 22, and the pivots 18 of the nose-embracing ring will therefore be drawn in a rearward direction. This will cause the ends of the nose-embracing ring-sections to move in a similar direction, and consequently the nose will be pinched by the ring and the spurs 21 will engage the same. The pain inflicted by these several devices will cause the animal to move rearwardly, thus relieving the strain upon the arms and permitting the parts to reassume their normal relation. It will thus be seen that all the objects pointed out in the preliminary portion of the specification are obtained, and, furthermore, the structure is of such a nature that it will withstand rough usage and exposure to the elements without derangement.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In an animal-poke, the combination with a stop member, of a nose-embracing ring having spurs, and a connection between the stop member and ring whereby the spurs of the latter will be movable into engagement with the animal upon the rearward movement of the stop member.

2. In an animal-poke, the combination with a neck-embracing ring, of an outstanding fence-engaging stop carried by the neck-embracing ring, a nose-embracing ring, and a connection between the rings.

3. In an animal-poke, the combination with a neck-embracing ring having a stop, of a nose-embracing ring having spurs, and a link connection between the rings.

4. In an animal-poke, a nose-embracing ring comprising pivotal sections, and a stop element having connection with the ring to swing the sections upon the movement of said element.

5. In an animal-poke, an extensible and contractible nose-embracing ring, and a stop element having a connection with the ring to move said ring upon the movement of said element.

6. In an animal-poke, a nose-embracing ring comprising sections, pivots adjustably connecting the sections, and a stop element having a connection with the ring to swing the sections upon the movement of said element.

7. In an animal-poke, a nose-embracing ring comprising sections, pivots connecting the sections, and a stop element having connections with the pivots.

8. In an animal-poke, the combination with a neck-embracing ring comprising pivotal sections, of a nose-embracing ring comprising pivotal sections, and a connection between the rings.

9. In an animal-poke, the combination with a neck-embracing ring comprising pivotal sections, of a nose-embracing ring comprising pivotal sections, and a link connecting the rings said link being attached to the neck-embracing ring at one side of its pivot.

10. In an animal-poke, the combination with a neck-embracing ring comprising pivotally-associated sections, of a nose-embracing ring comprising pivotally-associated sections, and links attached to the pivots of the nose-embracing ring and to one of the sections of the neck-embracing ring.

In testimony that I claim the foregoing as my own I have hereto affixed my signature in the presence of two witnesses.

THOMAS H. EWING.

Witnesses:
   FRED. A. SOWERS,
   J. E. W. COBB.